(12) United States Patent
Gebler et al.

(10) Patent No.: US 7,400,265 B2
(45) Date of Patent: Jul. 15, 2008

(54) REMOTELY READABLE GAS METER AND METHOD OF USING THE SAME

(75) Inventors: Kirk A. Gebler, Chagrin Falls, OH (US); John G. Henderson, Columbus, IN (US)

(73) Assignee: Innovative Technology Concepts, Chagrin Falls, OH (US)

( * ) Notice: Subject to any disclaimer, the term of this patent is extended or adjusted under 35 U.S.C. 154(b) by 191 days.

(21) Appl. No.: 11/387,333

(22) Filed: Mar. 23, 2006

(65) Prior Publication Data

US 2006/0226825 A1 Oct. 12, 2006

Related U.S. Application Data

(60) Provisional application No. 60/664,984, filed on Mar. 24, 2005.

(51) Int. Cl.
*G08C 19/06* (2006.01)
(52) U.S. Cl. ............................. 340/870.33; 324/207.22; 324/207.23; 73/861.94
(58) Field of Classification Search ............ 340/870.33; 324/207.22, 207.23; 73/861.94
See application file for complete search history.

(56) References Cited

U.S. PATENT DOCUMENTS 3,961,316 A 6/1976 Myer

| | | |
|---|---|---|
| 4,337,466 A | 6/1982 | Spahn |
| 4,654,662 A | 3/1987 | Van Orsdel |
| 4,728,950 A | 3/1988 | Hendrickson et al. |
| 5,777,222 A | 7/1998 | Roberts |
| 6,100,816 A | 8/2000 | Moore |
| 6,437,697 B1 | 8/2002 | Caro |
| 6,742,396 B2 | 6/2004 | Schenk, Jr. |
| 6,982,651 B2 | 1/2006 | Fischer |

*Primary Examiner*—Timothy Edwards, Jr.
(74) *Attorney, Agent, or Firm*—Fay Sharpe LLP

(57) ABSTRACT

A sensing device for remotely reading the position of the needles of a gas meter. The gas meter having a plurality of meter needles. The sensing device including directional magnetic field emitters each having a north and a south pole that are spaced from one another along a first pole axis and a second pole axis, respectively. The magnetic emitters being secured relative to respective needles such that the pole axes are perpendicular to the respective needle axes. The emitters producing directional magnetic fields that follows the position of the needles as they rotate. The device further including position sensors positioned over the emitters. The sensors reading the orientation of the respective magnetic fields sending this information to a processor for calculating the position of the first and second needles based on the orientation of the respective magnetic fields. The device includes a transmitter for transmitting the position of the needles to a remote location.

23 Claims, 3 Drawing Sheets

REMOTELY READABLE GAS METER AND METHOD OF USING THE SAME

This application claims priority in Provisional Patent Application Ser. No. 60/664,984 that was filed on Mar. 24, 2005.

The present invention relates to monitoring the consumption of a utility such as the amount of natural gas used by a consumer and, more particularly, to an apparatus and method for remotely monitoring the consumption.

INCORPORATION BY REFERENCE

The present invention relates to remotely monitoring a utility such as the consumption of natural gas by a consumer. Hendrickson, et al. U.S. Pat. No. 4,728,950 discloses a magnetic sensor apparatus for remotely monitoring the utility meter and is incorporated by reference herein for showing the same. Fischer, U.S. Pat. No. 6,982,651 discloses an automatic meter reading module and is incorporated by reference herein for showing the same. Moore, U.S. Pat. No. 6,100,816 discloses a utility meter adapter that mounts on a utility meter and is incorporated by reference herein for showing the same. Ban Orsdel, U.S. Pat. No. 4,654,662 discloses an apparatus for reading utility meters and is incorporated by reference herein for showing the same. Roberts, U.S. Pat. No. 5,777,222 discloses a fluid meter with modular automatic meter reading unit and is incorporated by reference herein for showing the same. Spahn, U.S. Pat. No. 4,337,466 discloses tamper protection for an automatic remote meter reading unit and is incorporated by reference herein for showing the same. Myer, U.S. Pat. No. 3,961,316 discloses a mechanically actuated magnetocrystalliane counter and is incorporated by reference herein for showing the same. Schenk, Jr. U.S. Pat. No. 6,742,396 discloses a method for upgrading a dial indicator to provide remote indication capability and is incorporated by reference herein for showing the same.

BACKGROUND OF THE INVENTION

It is known in the art that magnetics can be used to determine the position of an object relative to a fixed point. In this respect, Hendrickson U.S. Pat. No. 4,728,950 discloses a remote monitoring device that utilizes magnetics to determine the position of the needles in a utility meter. Hendrickson determines the position of the meter by utilizing ten sensors circumferentially spaced about the needle axis and a magnetized needle. The position of the needle can be determined when the needle is positioned under one of the sensors. As can be appreciated, the magnetic on the needle must be spaced from the needle axis such that the magnetic passes by the sensor as the needle rotates. When the magnetic portion of the needle passes a sensor, the position of the needle is detected. However, when the needle is between sensors, the presence of the needle is not fully detected and assumptions must be made about the position of the needle. As a result, while Hendrickson is capable of determining the position of the needle, accuracy is suspect and assumptions must be made for the needles which are not positioned in range of one of the ten sensors. Hendrickson's device is also expensive in that it needs ten sensors for every needle. When a four needle meter needs to be monitored, 40 sensors are needed. In addition, as is shown, the sensors must be placed at a point space from the needle axis such that the monitoring device blocks the gauges thereby preventing the meter to be read except by the monitoring system. This can make trouble shooting the system difficult and costly and can prevent quick verification that the system is functioning properly.

Schenk, Jr., U.S. Pat. No. 6,742,396 overcomes some of the accuracy and readability shortfalls of Hendrickson by utilizing a variable monitoring technique that has an external readable portion. In this respect, Schenk, Jr. discloses a dial indicator that utilizes magnets to couple the meter's dial needle to a rotating measuring device. This system is not a magnetic sensing system. Conversely, the magnets merely couple the moving parts of the sensing system to the meter's needle such that a sensing system follows the dial needle as it rotates. Thus, Schenk's device requires moving parts to monitor the meter. Further, the magnetic strength necessary to physically lock the moving parts of the sensor to the meter's needle is greater than that which is necessary for non-mechanical devices due to inevitable friction between the moving parts. Friction in the monitoring sensor can also cause the monitoring device to become disconnected with the meter's dial. If this takes place, the output of the remote monitoring device is worthless. As can be appreciated, the remote monitoring device is of little value unless it can be relied upon by the end user. The longevity of Schenk is also suspect in that the monitoring device is in constant motion and internal components can wear. Yet another problem with Schenk's device is that the moving parts of his sensor are not capable of continued rotation. Conversely, Schenk's device can not rotate more than 360 degrees which prevents it from being used on many meters.

Both Schenk and Hendrickson do not allow sufficient visual inspect of the actual dials or needles. In this respect, gas companies, and other utilities, are required to verify the accuracy of meter readings. This requirement necessitates a periodic visual inspection of the meter. Hendrickson prevents a visual inspection of the dials since his system completely covers the meter's dials. As a result, a visual inspection requires his system to be at least partially removed from the meter. As can be appreciated, periodic removal of the sensing system is expensive and can damage the unit. While Schenk provides a means for inspecting the position of the needle on site, the actual needle is still not visible whereby confirmation that the system is producing an accurate reading also requires removal of the system from the meter.

STATEMENT OF INVENTION

In accordance with the present invention, a remotely readable gas meter is provided that allows an existing gas meter to be read at a remote location.

More particularly, provided is a sensing device for remotely reading the position of the needles of a gas meter. The gas meter having a plurality of meter needles including a first and a second needle. The first needle rotating about a first needle axis and the second needle rotating about a second needle axis wherein the second needle is driven in relation to the rotation of the first needle and rotating 36 degrees for every full rotation of the first needle. The first needle rotating based on the volume of gas passing through the gas meter. The sensing device having a first and a second directional magnetic field emitter each with a north and a south pole that are spaced from one another along a first pole axis and a second pole axis respectively. The first magnetic emitter being secured relative to the first needle such that the first pole axis is perpendicular to the first needle axis and the first emitter producing a first magnetic field that follows the position of the first needle as it rotates. The second magnetic emitter being secured relative to the second needle such that the second pole axis is perpendicular to the second needle axis and the second emitter produces a second magnetic field that follows the position of the second needle as it rotates. The device further including a first position sensor positioned over the first emitter and a second position sensor positioned over the second emitter wherein the first sensor reads the orientation of the first magnetic field and the second sensor reads the orientation of the second magnetic field. The device having a processor in communication with the first and second sensors for calculating the position of the first and second needles based on the orientation of the respective magnetic fields and a transmitter for transmitting the position of the needles to a remote location.

According to another aspect of the present invention, the sensing device includes first, second, third and fourth directional magnetic field emitters each having a north and a south pole that are spaced from one another along a respective pole axis. The device further including a sensor for sensing the orientation of the four magnetic fields and a processor in communication with the sensor that is programmed to calculate the position of the magnetic fields based on the output of the sensor. A transmitter is utilized to transmit the position of the needles to a remote location.

According to yet another aspect of the present invention, provided is a sensing device for remotely reading the position of the needles of a gas meter with a single directional magnetic field emitter secured relative to the first needle. A position sensor is positioned over the single emitter for reading the orientation of the magnetic field of only the first gas meter needle and a processor is in communication with the sensor to calculate the position of the first needle based on the orientation of the magnetic field. The device further includes memory chip in communication with the processor for tracking the movement of the first needle and storing data on the number of revolutions of the first needle during any given interval. A transmitter is used to transmit the data from the sensor to a remote location.

According to a further aspect of the present invention, provided is a method of remotely reading a gas meter. The method includes the step of securing at least a first directional magnetic field emitter relative to the first needle and a second directional magnetic field emitter relative to the second needle. The method further including the steps of positioning a receiver unit over top of the first and second emitters such that a first position sensor of the unit is axially spaced relative to the first needle axis over the first emitter and the second position sensor of the unit is axially spaced relative to the second needle axis over the second emitter. The method further includes the step of providing a processor for reading the data produced by the first and second sensors and a transmitter for transmitting the position of the needles to a remote location wherein the processor and the transmitter are in communication with the first and second position sensors. Then, reading the orientation of the first magnetic field and reading the orientation of the second magnetic field wherein the processor can calculate the angular position of the first and second needles based on the reading steps. Then, transmitting the calculations to a remote location.

According to yet even another aspect of the present invention, provided is a method of remotely reading a gas meter wherein in a single directional magnetic field emitter is positioned relative to the first needle. The method includes the step of positioning a receiver unit over top of the emitter sensing the orientation of the single magnetic field with a provided a processor. The data is then calculated along with a count on the number of revolutions of the first needle to determine gs usage. This information on the number of complete rotations and the position of the first needle is then transmitted to a remote location.

BRIEF DESCRIPTION OF DRAWINGS

The foregoing, and more, will in part be obvious and in part be pointed out more fully hereinafter in conjunction with a written description of preferred embodiments of the present invention illustrated in the accompanying drawings in which.

DESCRIPTION OF PREFERRED EMBODIMENTS

Figure 1:
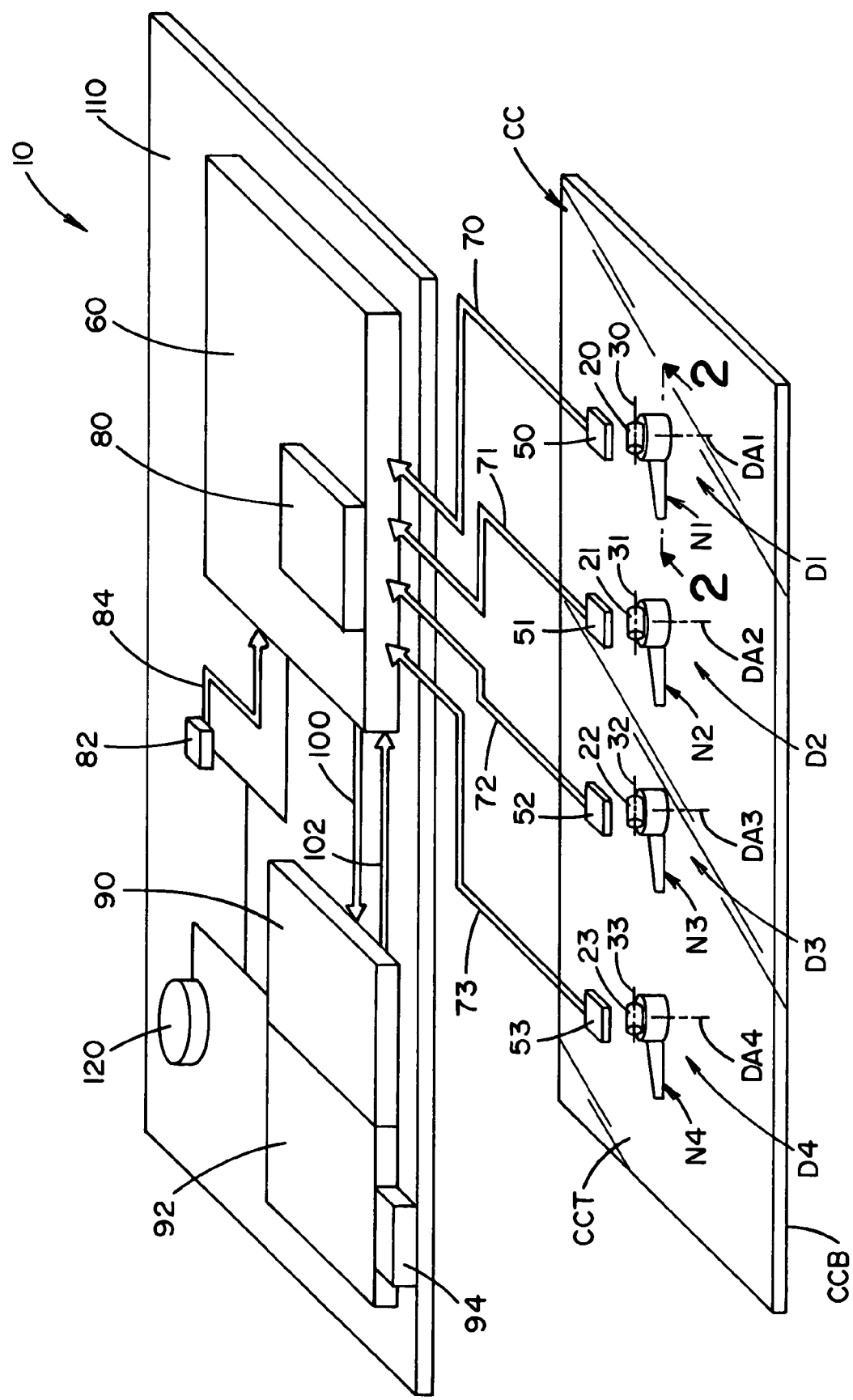
FIG. 1 is an exploded view of a remote sensing device according to the present invention.
Figure 2:
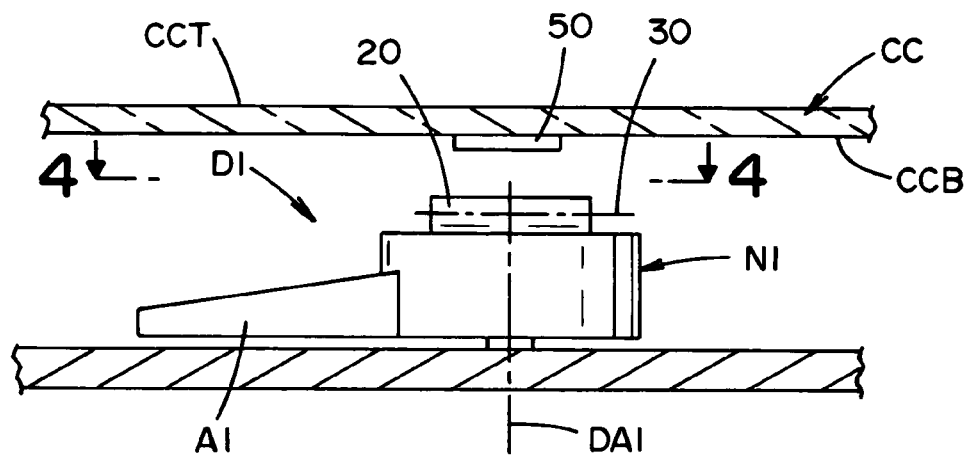
FIG. 2 is an enlarged sectional view taken along lines 2-2 in FIG. 1.
Figure 3:
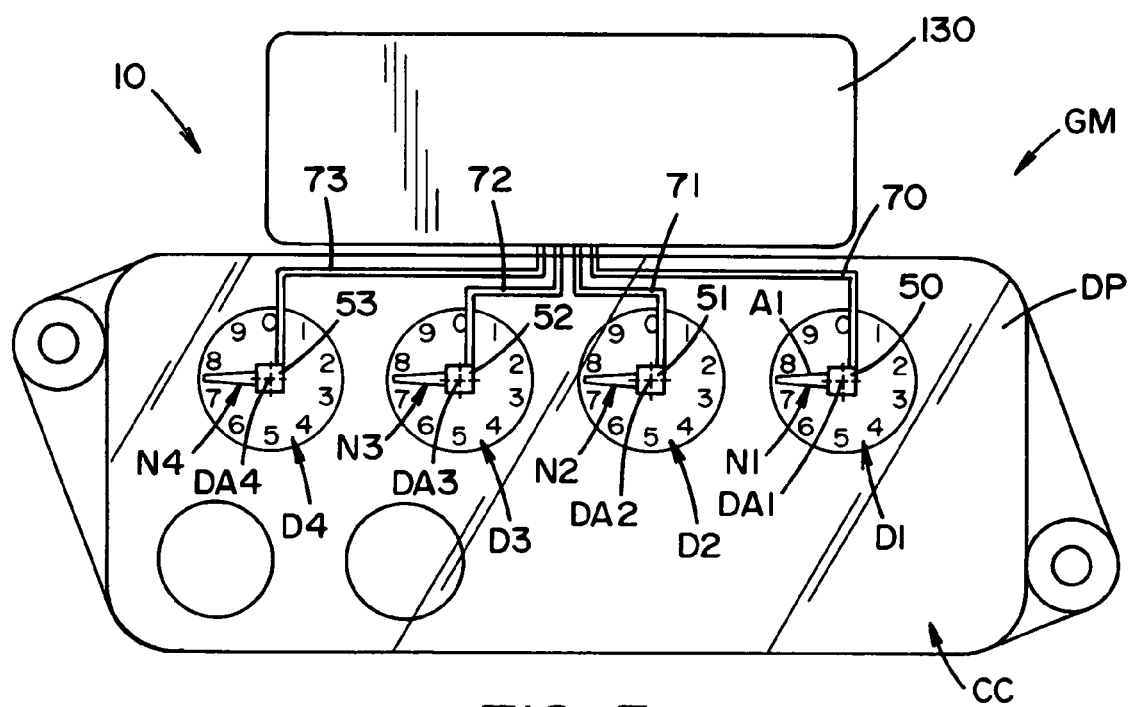
FIG. 3 is an elevational view of the device shown in FIG. 1 mounted onto the display panel of a gas meter; and, FIG. 4 is an enlarged view taken from lines 4-4 in FIG. 2.

Referring now in greater detail to the drawing wherein the showings are for the purpose of illustrating preferred embodiments of the invention only, and not for the purpose of limiting the invention, FIGS. 1-4 illustrate a remote readable sensing device 10 for a gas meter GM. Sensing device 10 is configured to be utilized on an existing meter such that it can be secured to an existing meter without disrupting the flow of gas therethrough. However, it must be noted that sensing device 10 could also be used on new meters without detracting from the invention of this application. As is shown, sensing device 10 is mounted directly to the display panel portion DP portion of meter GM to allow remote monitoring of the gauges.

Meter GM is shown to have a four dial or needle arrangement including dials D1, D2, D3 and D4. As can be appreciated, the sensing arrangement of this application can be used in connection with meters having more or less than four dials/needles.

As is known in the art, dials D1, D2, D3 and D4 work in relation to one another in that the flow of natural gas through the gas meter initiates rotational movement of needle N1 of dial D1 about a first dial axis DA1. Then, a full 360° rotation of needle N1 causes a needle N2 of Dial D2 to rotate 36° about a second dial axis DA2. As can be appreciated, a 36° rotation of needle 2 will move the needle by one unit about dial D2. Similarly, a full rotation of needle N2 about second dial axis DA2 will result in a 36° rotation of a needle N3 about a dial axis DA3. Dial D4 is also similarly controlled in that a full rotation of needle N3 about dial axis DA3 will result in a 36° rotation of a needle N4 about a dial axis DA4. This results in dial D1 measuring single unit increments, dial D2 measuring 10 unit increments, dial D3 measuring 100 unit increments and dial D4 measuring 1,000 unit increments. As is discussed above, based on the volume of flow, more or less dials could be used without detracting from the invention of this application. Further, the dials could be used to measure different percentages or units without detracting from the invention of this application. In this respect, dial D1 could measure $\frac{1}{10}$ of a unit increments etc. However, while the invention of this application has been found to work well with this type of meter arrangement and, therefore, it is described in relation to this type of meter, the invention of this application can work with a wide range a meters including, but not limited to, electric dial meters.

Sensing device 10 includes four directional magnetic field emitters 20-23, each having a north pole and a south pole that extend along pole axes 30-33, respectively. As is shown, directional emitters 20-23 are cylindrical magnets having a north and south pole. However, the invention of this application is not to be limited to cylindrical magnets. Other directional magnets could be utilized without detracting from the invention of this application. This includes, but is not limited to, pole magnets with almost any shape.

Emitter 20 is positioned on needle N1 such that pole axis 30 is perpendicular to dial axis DA1. Similarly, directional emitter 21 is secured to needle N2 such that pole axis 31 is perpendicular to dial axis DA2. Directional emitter 22 is secured to needle N3 such that pole axis 32 is perpendicular to dial axis DA3 and directional emitter 23 is secured to needle N4 such that pole axis 33 is perpendicular to dial axis DA4. As a result, as the respective needle rotates about its axis, the directional emitter also rotates about the same axis wherein the direction of the magnetic field rotates with the rotation of the needle. However, it should be noted that there could be some amount of inaccuracy in the installation angle of the magnet relative to the needle. In this respect, it is difficult to position the magnet such that it is perfectly perpendicular to the needle. Small misalignments will not prevent the sensors from properly reading the needle position. Larger misalignments can be addressed by the processor. In this respect, the processor can store a small calibration offset in memory and apply it when making a read allowing for faster/easier manufacturing and more accuracy in the meter reading.

Figure 4:
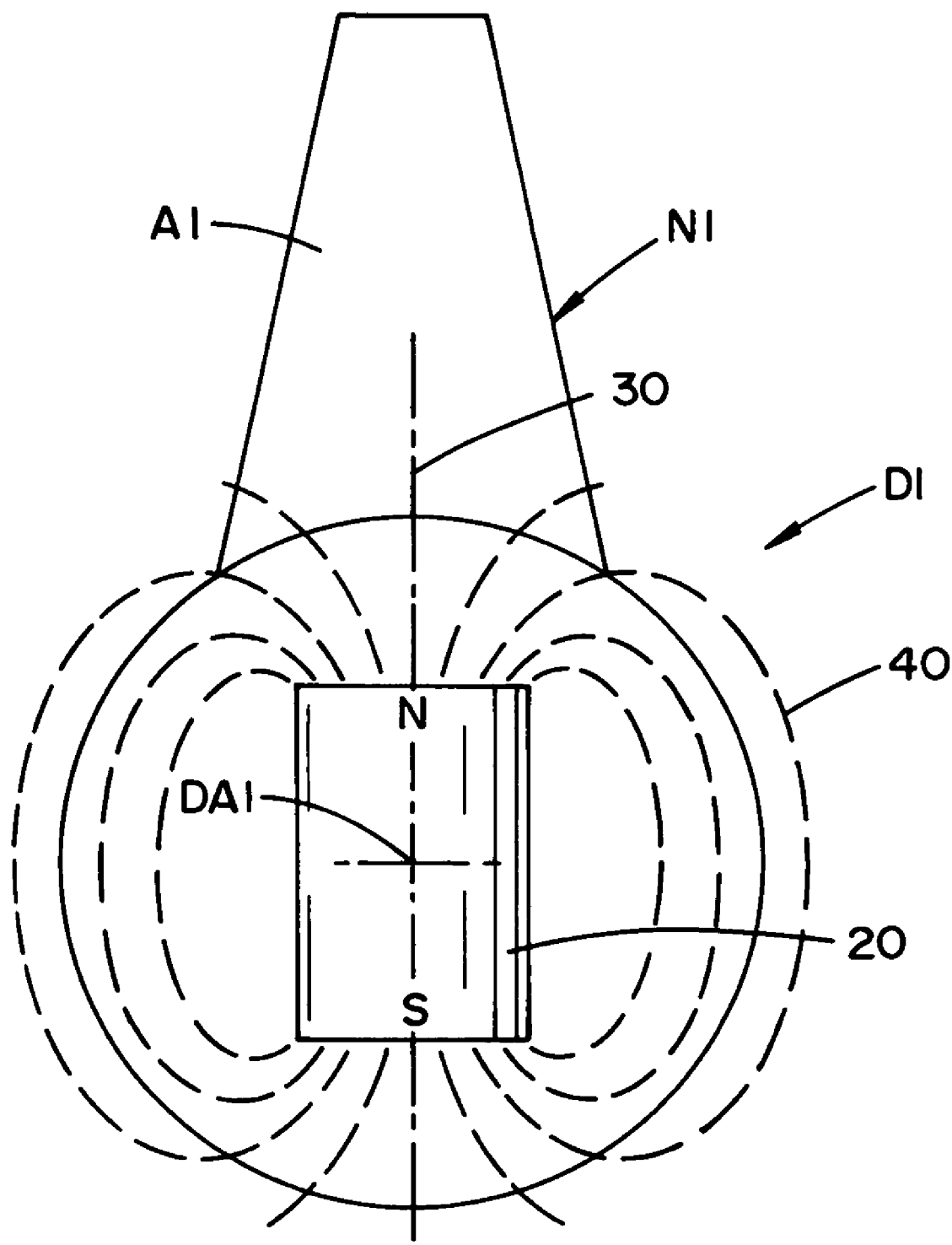

With reference to FIG. 4, shown is an enlarged view of needle N1 of dial D1 with directional emitter 20 mounted thereto. As is shown, the north and south pole arrangement of emitter 20 is such that the north pole portion of the emitter is pointing at 12:00 in the figure. While axis 30 is shown to be in alignment with arrow portion A1 of needle N1, this is not required for the invention of this application. In the position shown, the magnetic field 40 of directional emitter 20 extends about pole axis 30 such that it is in alignment with the pole axis. As needle N1 rotates about dial axis DA1, directional emitter 20 follows this rotation wherein the direction of the magnetic field follows the rotation of the needle. The same is true for dials D2, D3 and D4. In this embodiment, the directional field emitters are clipped onto existing needles. However, the emitter could also be secured by other mechanical means and/or could be adhesively secured to an existing needle.

In another embodiment, the invention of this application can be used with new meter designs including meters having needles with directional magnetic emitters built therein. Further, even if the invention of this application is used on an existing gas meter, the needles of the existing gas meter can be replaced with needles having magnetic directional emitters manufactured therein. This can include, but is not limited to, polymer needles having a magnetic emitter molded therein.

The directional emitters are secured to the needles and are protected under clear cover CC. As is known in the art, the display panel is protected by a glass cover (or similar substantially clear material such as, but not limited to, clear plastics) to protect the meter assembly while allowing the meter to be read to determine gas consumption. As can be seen, the directional emitters allow for an unobstructed view of the needle positions.

Sensing device 10 further includes position sensors 50-53 that are positioned relative to directional emitters 20-23, respectively. Position sensors 50-53 are state of the art small directional magnetic field detecting units that are positioned directly above the directional emitter magnets. In one embodiment, position sensors 50-53 are secured directly to bottom surface of clear cover CC. In another embodiment, the sensors are positioned outside of cover CC such as on surface CCT. The position sensors provide a sine and cosine voltage output that is dependent on the angular position of the respective directional emitter. This sine and cosine voltage is then directed to the processor which uses this information to determine the angular position of the directional emitter relative to the sensor. This is accomplished through mathematical equations from these voltage inputs and produces an error that is less than 2°. The position sensors can be any position sensors known in the art which detect the orientation of a magnetic field.

Position sensors 50-53 are in communication with a processor 60 which can include, but is not limited to, having the sensors electronically connected to processor 60 by way of electrical connections 70-73. As can be appreciated, these electrical connections could be wire connections to a processor spaced from the sensors or even could be part of a solid state circuit board. Further, while not shown, processor 60 could be spaced from the sensors or even at a remote location which will be discussed in greater detail below. As a result of the use of directional sensors 50-53, sensing device 10 can be configured to include no moving parts which minimizes power consumption and maximizes the reliability of the system.

Processor 60 can be any processor known in the art that is capable of making the necessary calculations in view of the sine and cosine voltage produced by the sensors. This includes the use of current technology microprocessors and future technology microprocessors able to make such calculations. As is stated above, processor 60 can be hard wired to the sensors including, but not limited to, being manufactured as a part of a solid state circuit board.

Sensing device 10 can further include an analog to digital converter 80 for position sensors that produce an analog system. As is known in the art, an analog to digital converter will convert this analog signal from the sensors to a digital signal that can be processed by processor 60. Converter 80 can be a part of processor 60 or can be an external component positioned, circuit wise, between sensors 50-53 and processor 60 wherein the converter receives the analog voltage outputs from the position sensor and sends the corresponding digital signal to the processor.

Sensing device 10 can further include a temperature sensor 82 for increasing the accuracy of the system. In this respect, temperature sensor 82 is in communication with processor 60 by way of connection 84 wherein the temperature sensor provides digital measurements of the current ambient temperature of the system. This is helpful in that the sensor is effected by changes in the ambient temperature wherein if this temperature is known, the processor can make the proper adjustments to the calculations. Processor 60 can at any time determine the position of needles N1-N3 in view of the input received on the orientation of the respective magnetic fields of emitters 20-23. This calculation is made more accurate by determining the ambient temperature of the system by temperature sensor 82.

This information produced by processor 60 can be used in many ways and can be maintained in many ways without detracting from the invention of this application. In this respect, sensing device 10 can further include a data storage component 90, a transmitter and/or receiver 92 and an output port 94. The data calculated by processor 60 can then be communicated with components 90, 92 and/or 94 by way of communication lines 100 and/or 102. Again, the circuits of sensing device 10 can be solid state circuits such that all components are a part of a circuit board 110 shown or they can be components separated from one another by data lines and/or transmitters and receivers.

Data storage component 90 can be a non-volatile rewritable memory such as EPROM or other current technology. Further, other data storage devices know in the art could be utilized without detracting from the invention of this application. The data can then be stored wherein it is maintained until requested by the remote location.

As can be appreciated, electrical power is needed to operate many of these components described above. Therefore, a battery 120 can be included in sensing device 10. As can be appreciated, if battery technology is utilized, any battery technology known in the art could be used in connection with this device. Further, it is desirable when batteries are utilized to conserve power consumption. As a result, for battery applications, it is best to only periodically send and/or receive data which will be discussed in greater detail below. It should be noted, however, that other power technologies could be used in connection with the invention of this application. This includes, but is not limited to, the use of solar cells (not shown).

In one embodiment, the components are secured to board sensor include only a one way communication arrangement from the output of processor 60. This configuration allows the processor to operate based on an internal operating procedure or program to monitor the gas consumption. More particularly, sensing device can be configured to merely output data at specified times with a timing device (not shown) or can output data after a specified amount of gas is consumed. This output can then be recorded and stored in memory card 90 and/or transmitted to the remote location by way of transmitter 92. Further, any one of a number of factors could be used to determine the point in which data is transmitted to the remote location. Further, a constant stream of data could be transmitted to the remote location; however, this could have an adverse affect on the battery life if a battery is being utilized.

In another embodiment, both communication lines 100 and 102 could be utilized such that device 10 includes two two-way communication between components 90, 92, 94 and the processor. While two-way communication is not required, it can be utilized to improve or increase the functionality of the device. In this respect, component 94 could be a transceiver such that sensor device 10 can send and receive data. Receiving data can be utilized to request a meter reading at any time or even to reprogram processor 60. Further, two way communication can be utilized to allow data to be stored and then reused by the processor at a later time. For example, data from prior reading could be compared to determine increases and/or decreases in the consumption of gas.

With two way communication, data storage unit 90 could also be used store necessary operating parameters for processor 60. The storage of data will allow the transmitter to only be utilized when needed. Again, if sensing device 10 includes a receiver, data can be stored in device 90 until a signal is received by device 92 and at that time data could be then transmitted to the remote location. In addition, data on usage and/or consumption rates of the end user could also be stored on device 90.

As is stated above, device 92 can be a transmitter, a transmitter and a receiver or a transceiver. These devices are known in the art and can be used to send and/or receive information. Sensing device 10 can further include an output port 94 that could be used for onsite inspection and/or repair or reprogramming of the system. This can be any known port including, but not limited to, a USB port utilized to access the system.

In yet another embodiment, some of the components of system 10 could be positioned at the remote location. Further, the wording "remote location" is not restricted to any one type of remote location. For example, sensing device 10 could include only a minimal number of components on site while the remainder of the components are operated away from the gas meter and/or the consumer. More particularly, sensing device 10 could be modified to transmit the raw data from the sensors to the remote location wherein the processor is spaced from the sensing devices. In this respect, while not shown, the devices on site could include directional emitters 20-23, sensors 50-53, temperature sensor 82 and data transmitter and/or receiver 92 along with power source 120. The raw data produced by the sensors could then be transmitted to a remote location for processing. As can be appreciated, this arrangement could further reduce the power consumption of the device and simplify the component that would be needed to be mounted to the gas meter. Further, this arrangement could reduce cost in that a single processor and/or data device could be used for a large number of sensors in the field wherein large desktop computing devices could be used to process as much data as is desired without concern for power conservation.

With respect to the definition of remote, remote can mean a wide range of places that are spaced from the gas meter. For example, while some of the components must be connected directly to the gas meter, some components do not have these same restrictions. In yet another embodiment, directional emitters 20-23 and sensors 50-53 are mounted directly to the gas meter as is described above. However, spaced from the gas meter but within close proximity to the gas meter, is some or all of the remaining components described above. For example, these remaining components could be a small solid state component plugged directly into a wall outlet on site wherein the information from the sensors needs only to be transmitted a short distance to the closest wall outlet. Then, this data is processed and/or transmitted to a further remote location away from the point of consumption of the natural gas. As a result, there are different levels of remoteness for the device of this application and transmission can include multiple steps of transmission. These multiple steps can include the across-the-room type transmission discussed directly above or local transmission to a truck directly in front of the house or even regional and/or global communications utilizing cellular technology, the internet and/or satellite technology. As can be appreciated, the use of multiple stages of transmission can be utilized to minimize power consumption in that small, low power draw equipment can be mounted to the meter such that a weak signal is sent to a second spaced component which then transfers raw and/or processed data to a more powerful transmitter and/or receiver that could be hard wired to a power source.

Further, in yet another embodiment, the components mounted to the gas meter could be hard wired to a power source and/or the remaining components of the system such that the transmission from the sensors to the remaining components is by way of a wired system.

Sensing device 10 can be encased in an enclosure 130 wherein enclosure 130 is secured to a portion of gas meter GM. The enclosure 130 can be attached to the gas meter with any known technology including mechanical fasteners and/or adhesives. Further, enclosure 130 can be spaced from cover CC such that the actual needles can be easily viewed even when sensor 10 is in an operating position. Tamper prevention devices could also be used in connection with the sensing device. In this respect, sensing device 10 can further include tamper sensing equipment (not shown) including tilt sensors and/or motion sensors or any other sensor known in the art for this type of detection. If these sensors detect what is believed to be an attempt to tamper with sensing device 10, this information can be stored and/or transmitted by sensing device 10.

In yet another embodiment, sensing device can be programmed to include a sleep mode wherein power consumption is minimized even more. In this respect, due the accuracy of the above described sensing arrangement, the system can shut down until a signal is received to do a meter reading or even based on a time schedule etc. This allows the system to maximize battery life without reducing accuracy.

Further, in yet another embodiment, the on-board battery and/or power source can be supplemented by a larger battery and/or power supply such as a low voltage DC power supply that is plugged into an outlet.

In even yet a further embodiment, sensing device 10 can also include an electric flow control devices (not shown) such as a capacitor or other systems known in the art to prevent damage to the electronic circuits in the event of a power surge.

In addition to the above, it should also be noted that new technologies could also be utilized to perform one or more of the operations described above without detracting from the invention of this application.

While considerable emphasis has been placed on the preferred embodiments of the invention illustrated and described herein, it will be appreciated that other embodiments and/or equivalents thereof can be made and that many changes can be made in the preferred embodiments without departing from the principals of the invention. Accordingly, it is to be distinctly understood that the foregoing descriptive matter is to be interpreted merely as illustrative of the invention and not as a limitation.

Having thus defined the invention, the following is claimed:

1. A sensing device for remotely reading the position of the needles of a gas meter, the gas meter having a plurality of meter needles including a first and a second needle, the first needle rotating about a first needle axis and the second needle rotating about a second needle axis, the second needle being driven in relation to the rotation of the first needle and rotating 36 degrees for every full rotation of the first needle, the first needle rotating based on the volume of gas passing through the gas meter, said sensing device comprising a first and a second directional magnetic field emitter each having a north and a south pole that are spaced from one another and define a first pole axis and a second pole axis respectively, said first directional magnetic field emitter producing a first magnetic field oriented relative to said first pole axis and said second directional magnetic field emitter producing a second magnetic field oriented relative to said second pole axis, said first magnetic emitter being secured relative to the first needle such that said first pole axis is generally perpendicular to said first needle axis and centered about said first needle axis such that said first magnetic field rotates about said first needle axis as said first needle rotates about said first needle axis, said second magnetic emitter being secured relative to the second needle such that said second pole axis is generally perpendicular to said second needle axis and centered about said second needle axis such that said second magnetic field rotates about said second needle axis as said second needle rotates about said second needle axis; a first position sensor positioned over said first emitter and a second position sensor positioned over said second emitter, said first sensor being a first single directional magnetic field detecting unit adapted to measure the rotational position of said first pole axis about said first needle axis and said second sensor being a second single directional magnetic field detecting unit adapted to measure the rotational position of said second pole axis about said second needle axis; a processor in communication with said first and second sensors, said processor calculating the position of the first and second needles based solely on the rotational orientation of the respective magnetic fields; and a transmitter for sending information on said position of the needles to a remote location.

2. The sensing device of claim 1, wherein said first and second directional magnetic field emitters being clipped to the respective meter needles.

3. The sensing device of claim 1, wherein said first and second directional magnetic field emitters are cylindrical pole magnets with said north pole at or near a first end and said south pole at or near a second end, said north and south poles being generally centered on either side of the respective needle axes.

4. The sensing device of claim 1, further including first and second sensor needles configured to replace the first and second meter needles respectively, said first and second sensor needles including said first and second directional magnetic field emitters formed therein.

5. The sensing device of claim 1, wherein said first and second directional magnetic field detecting units each produce a sine and a cosine voltage output, said processor being programmed to convert at least one of said sine and cosine output voltage into an angular position of the respective needle.

6. The sensing device of claim 1, further including an analog to digital converter in communication with said magnetic field detecting units and said processor, said converter receiving an analog signal from said detecting units and transferring a digital signal to said processor.

7. The sensing device of claim 1, further including a memory device for storing information on gas consumption by the consumer.

8. The sensing device of claim 1, further including a timer, said timer being in communication with said processor and controlling when the meter is read.

9. The sensing device of claim 1, further including a solar cell that provides the power for said sensing device.

10. The sensing device of claim 1, further including a third directional magnetic field emitter generally centered about a third needle axis of a third needle, said third emitter producing a third magnetic field that rotates about said third needle axis relative to the rotation of said third needle; said device further including a third single directional magnetic field detecting sensor positioned over said third emitter which is in communication with said processor.

11. The sensing device of claim 10, further including a fourth directional magnetic field emitter generally centered about a fourth needle axis of a fourth needle, said fourth emitter producing a fourth magnetic field that rotates about said fourth needle axis relative to the rotation of said fourth needle; said device further including a fourth single directional magnetic field detecting sensor positioned over said fourth emitter which is in communication with said processor.

12. The sensing device of claim 11, further including a fifth directional magnetic field emitter generally centered about a fifth needle axis of a fifth needle, said fifth emitter producing a fifth magnetic field that rotates about said fourth needle axis relative to the rotation of said fourth needle; said device further including a fifth single directional magnetic field detecting sensor positioned over said fifth emitter which is in communication with said processor.

13. The sensing device of claim 1, wherein said transmitter is a transceiver wherein said sensing device can both send and receive data.

14. A sensing device for remotely reading the position of the needles of a gas meter, the gas meter including a first, a second needle, a third needle and a fourth needle, each needle rotating about a respective needle axis, the second, third and fourth needle being driven in relation to the rotation of the first needle and rotating 36 degrees for every full rotation of the previous needle, the first needle rotating based on the volume of gas passing through the gas meter, said sensing device comprising;

first, second, third and fourth directional magnetic field emitters each having a north and a south pole that are spaced from one another along a respective pole axis, said first magnetic emitter being secured relative to the first needle such that said first pole axis is generally perpendicular to said first needle axis and said first emitter produces a first magnetic field that is generally centered about said first needle axis such that said north and south poles are on either side of said first axis and said first magnetic field rotates about said first needle axis as the first needle rotates about said first needle axis, said second magnetic emitter being secured relative to the second needle such that said second pole axis is generally perpendicular to said second needle axis and said second emitter produces a second magnetic field that is generally centered about said second needle axis such that said north and south poles are on either side of said second axis and said second magnetic field rotates about said second needle axis as the second needle rotates about said second needle axis, said third magnetic emitter being secured relative to the third needle such that said third pole axis is generally perpendicular to said third needle axis and said third emitter produces a third magnetic field that is generally centered about said third needle axis such that said north and south poles are on either side of said third needle axis and said third magnetic field rotates about said third needle axis as the third needle rotates about the third axis, said fourth magnetic emitter being secured relative to the fourth needle such that said fourth pole axis is generally perpendicular to said fourth needle axis and said fourth emitter produces a fourth magnetic field that is generally centered about said fourth needle axis such that said north and south poles are on either side of said fourth needle axis and said fourth magnetic field rotates about said fourth needle axis as the fourth needle rotates about the fourth axis;

a means for sensing the rotational orientation of said first, second, third and fourth magnetic fields;

a processor in communication with said sensing means, said processor being programmed to calculate the orientation of said magnetic fields based on the output of said sensing means; and, a means for transmitting the position of the needles to a remote location.

15. A sensing device for remotely reading the position of the needles of a meter, the meter having a meter needle that rotates about a needle axis, the needle rotating based on the flow of material passing through the meter, said sensing device comprising a directional magnetic field emitter having a north and a south pole that are spaced from one another along a magnetic pole axis, said emitter being secured relative to the needle such that said pole axis is generally perpendicular to said needle axis and said north and south poles are generally centered on either side of said needle axis, said emitter produces a magnetic field that is generally centered about said needle axis such that said magnetic field rotates about said needle axis as the needle rotates about said needle axis; a single position sensor positioned over said emitter for reading the rotational orientation of said magnetic field relative to said needle axis; a processor in communication with said sensor, said processor calculating the position of the needle based on the said rotational orientation of said magnetic field; and a transmitter for transmitting data from said sensing device to a remote location.

16. A sensing device for remotely reading the position of the needles of an a gas meter, the gas meter having a plurality of meter needles including a first and a second needle, the first needle rotating about a first needle axis and the second needle rotating about a second needle axis, the second needle being driven in relation to the rotation of the first needle and rotating 36 degrees for every full rotation of the first needle, the first needle rotating based on the volume of gas passing through the gas meter, said sensing device comprising a directional magnetic field emitter having a north and a south pole that are spaced from one another along a magnetic pole axis, said emitter being secured relative to the first needle such that said pole axis is generally perpendicular to said first needle axis and; said emitter produces a magnetic field that follows the position of the first needle as it rotates about said first needle axis; a position sensor positioned over said emitter for reading the rotational orientation of said magnetic field; a processor in communication with said sensor, said processor calculating the position of the first needle based on the rotational orientation of said magnetic field; a means for storing data in communication with said processor, said storage means tracking the movement of the first needle and storing data on the number of revolutions of the first needle during any given interval; and a transmitter for transmitting data from said sensing device to a remote location.

17. The sensing device of claim 16, wherein said data means is wired directly to said processor.

18. The sensing device of claim 16, wherein said data means is a remote date means in remote communication with said transmitter.

19. The sensing device of claim 16, wherein said data means includes a counter that counts each full revolution of the first needle.

20. A method of remotely reading a gas meter having a plurality of meter needles extending from a face plate and including a first and a second needle, the first needle rotating about a first needle axis and the second needle rotating about a second needle axis, the second needle being driven in relation to the rotation of the first needle and rotating 36 degrees for every full rotation of the first needle, the first needle rotating based on the volume of gas passing through the gas meter, the meter including a clear cover portion covering the needles and the face plate, said method including the steps of:

removing the clear cover from the meter;

securing a first directional magnetic field emitter to the first needle, said first emitter having a north and a south pole that are spaced from one another along a first pole axis, said first emitter being positioned such that said first pole axis is generally perpendicular to said first needle axis and centered about said first needle axis, said first emitter producing a first magnetic field that rotates about said first needle axis and which rotates with the first needle as it rotates about said first axis;

securing a second directional magnetic field emitter to the second needle, said second emitter having a north and a south pole that are spaced from one another along a second pole axis, said second emitter being positioned such that said second pole axis is generally perpendicular to said second needle axis and centered about said second needle axis, said second emitter producing a second magnetic field that that rotates about said second needle axis and which rotates with the second needle as it rotates about said second axis;

positioning a receiver unit over top of said first and second emitters such that a first position sensor of said unit is axially spaced along said first needle axis over said first emitter and a second position sensor of said unit is axially spaced along said second needle axis over said second emitter;

providing a processor for reading the data produced by said first and second sensors and a transmitter for transmitting said position of the needles to a remote location, said processor and said transmitter being in communication with said first and second position sensors;

reading the rotational orientation of said first magnetic field;

reading the rotational orientation of said second magnetic field; calculating the angular position of the first and second needles based on said reading steps; and, transmitting said calculations to a remote location.

21. A method of remotely reading a gas meter having a plurality of meter needles including a first and a second needle, the first needle rotating about a first needle axis and the second needle rotating about a second needle axis, the second needle being driven in relation to the rotation of the first needle and rotating 36 degrees for every full rotation of the first needle, the first needle rotating based on the volume of gas passing through the gas meter, said method including the steps of:

securing a directional magnetic field emitter relative to the first needle, said emitter having a north and a south pole that are spaced from one another along a pole axis, said emitter being positioned such that said pole axis is generally perpendicular to said first needle axis, said emitter producing a magnetic field that follows the position of the first needle as it rotates;

positioning a receiver unit over top of said emitter, said unit including a single position sensor that is axially spaced relative to said first needle axis over said emitter;

providing a processor for reading the data produced by said position sensor and a transmitter for transmitting said position of the needles to a remote location, said processor and said transmitter being connecting to said position sensor;

providing a counter in connection with said processor;

connecting said position sensor to said processor for reading the data produced by said position sensor;

counting the number of complete revolutions of the first needle;

reading the orientation of said magnetic field; calculating the angular position of the first needle based on said reading step; and transmitting said calculations on the angular position of the first needle and said number of complete rotations of the first needle to a remote location.

22. The sensing device of claim 16, wherein said directional magnetic field emitter is a first directional magnetic field emitter, said pole axis is a first pole axis, and said single position sensor is a first single position, said device further including a second directional magnetic field emitter having a north and a south pole that are spaced from one another along a second magnetic pole axis, said second emitter being secured relative to the second needle such that said second pole axis is generally perpendicular to said second needle axis; said second magnetic field rotating about said second needle axis as the second needle rotates about said second needle axis, said device further including a second single position sensor positioned over said second emitter for reading the rotational orientation of said second magnetic field; said second position sensor being in communication with said processor such that said processor also calculates the position of the second needle based on the rotational orientation of said second magnetic field.

23. A sensing device for remotely reading the position of the needles of a meter, the meter having a face plate with a meter needle extending from the face plate, the needle rotating about a needle axis and rotating based on the flow of the metered item passing through the meter, said sensing device comprising a directional magnetic field emitter having a north and a south pole that are spaced from one another along a magnetic pole axis, said emitter being secured to the needle such that said pole axis is generally perpendicular to said needle axis and said north and south poles are generally centered on either side of said needle axis, said emitter producing a magnetic field that is generally centered about said needle axis such that said magnetic field rotates about said needle axis as the needle rotates about said needle axis; a single position sensor positioned over said emitter and spaced from said face plate, said position sensor sensing the rotational orientation of said magnetic field relative to said needle axis; a processor in communication with said position sensor, said processor calculating the position of the needle based on said rotational orientation of said magnetic field; and a transmitter for transmitting data from said sensing device to a remote location.

\* \* \* \* \*